United States Patent
Musgrove et al.

(10) Patent No.: US 6,714,933 B2
(45) Date of Patent: Mar. 30, 2004

(54) CONTENT AGGREGATION METHOD AND APPARATUS FOR ON-LINE PURCHASING SYSTEM

(75) Inventors: Timothy Allen Musgrove, Morgan Hill, CA (US); Robin Hiroko Walsh, San Francisco, CA (US)

(73) Assignee: CNET Networks, Inc., San Francisco, CA (US)

( * ) Notice: Subject to any disclaimer, the term of this patent is extended or adjusted under 35 U.S.C. 154(b) by 0 days.

(21) Appl. No.: 10/119,311

(22) Filed: Apr. 10, 2002

(65) Prior Publication Data

US 2003/0065643 A1 Apr. 3, 2003

Related U.S. Application Data

(63) Continuation-in-part of application No. 09/566,734, filed on May 9, 2000.

(51) Int. Cl.[7] .................................................. G06F 17/30
(52) U.S. Cl. .......................................... 707/10; 705/27
(58) Field of Search ..................... 705/26, 27; 707/1–6, 707/10

(56) References Cited

U.S. PATENT DOCUMENTS

| | | | |
|---|---|---|---|
| 4,707,592 A | 11/1987 | Ware | 235/379 |
| 5,319,542 A | 6/1994 | King, Jr. et al. | 705/27 |
| 5,420,926 A | 5/1995 | Low et al. | 705/74 |
| 5,550,746 A | 8/1996 | Jacobs | 700/231 |
| 5,592,375 A | 1/1997 | Salmon et al. | 705/231 |
| 5,666,493 A | 9/1997 | Wojcik et al. | 705/26 |
| 5,671,279 A | 9/1997 | Elgamal | 705/79 |
| 5,710,887 A | 1/1998 | Chelliah et al. | 705/26 |
| 5,715,314 A | 2/1998 | Payne et al. | 705/78 |
| 5,727,048 A | 3/1998 | Hiroshima et al. | 395/93.12 |
| 5,742,768 A | 4/1998 | Gennaro et al. | 91/1 |
| 5,758,328 A | 5/1998 | Giovannoli | 705/26 |
| 5,758,329 A | 5/1998 | Wojcik et al. | 705/26 |
| 5,761,649 A | 6/1998 | Hill | 705/27 |
| 5,765,143 A | 6/1998 | Sheldon et al. | 705/28 |
| 5,774,872 A | 6/1998 | Golden et al. | 705/19 |
| 5,778,173 A | 7/1998 | Apte | 743/201 |
| 5,790,426 A | 8/1998 | Robinson | 702/179 |
| 5,790,677 A | 8/1998 | Fox et al. | 705/98 |
| 5,794,207 A | 8/1998 | Walker et al. | 705/1 |
| 5,794,221 A | 8/1998 | Egendorf | 705/40 |
| 5,802,497 A | 9/1998 | Manasse | 705/27 |
| 5,815,665 A | 9/1998 | Teper et al. | 709/229 |

(List continued on next page.)

OTHER PUBLICATIONS

US 5,894,520, 4/1999, Nielsen (withdrawn)
Poley et al., "The Potential for Trade Facilitated by the Internet 1996–2000: a Review of Demand Supply and Internet Trade Models" Jan. 1998, Proceedings of the Thurty–First Hawaii International Conference on System Sciences, vol. 4, pp 21–221.
Jones et al., "IndustryNet: a Model for Commerce on the World Wide Web" Oct. 1995, IEEE Expert, vol. 10, No. 5, pps. 54–59.

*Primary Examiner*—Jack Choules
(74) *Attorney, Agent, or Firm*—Nixon Peabody, LLP; Marc S. Kaufman

(57) ABSTRACT

A method of aggregating product information from a plurality of sources in a networked computer environment regarding products of a product category including the steps of providing a server interconnected to the network computer environment for providing a crawler to visit the plurality of sources and gathering product phrase information from each of the plurality of sources via the crawler, where the crawler utilizes computational linguistics to gather the product phrase information which includes a phrase and at least one characteristic of the phrase. The characteristic of the phrase may be frequency, location, font size, font style, font case, font effects, font color, collocation and co-occurrence of the phrase.

40 Claims, 6 Drawing Sheets

U.S. PATENT DOCUMENTS

| | | | |
|---|---|---|---|
| 5,825,884 A | 10/1998 | Zdepski et al. | 705/78 |
| 5,832,459 A | 11/1998 | Cameron et al. | 705/26 |
| 5,842,178 A | 11/1998 | Giovannoli | 705/26 |
| 5,878,141 A | 3/1999 | Daly et al. | 705/78 |
| 5,878,401 A | 3/1999 | Joseph | 705/22 |
| 5,895,454 A | 4/1999 | Harrington | 705/26 |
| 5,898,777 A | 4/1999 | Tycksen, Jr. et al. | 705/53 |
| 5,899,980 A | 5/1999 | Wilf et al. | 705/26 |
| 5,909,492 A | 6/1999 | Payne et al. | 705/78 |
| 5,909,673 A | 6/1999 | Gregory | 705/45 |
| 5,920,854 A * | 7/1999 | Kirsch et al. | 707/3 |
| 5,930,768 A | 7/1999 | Hooban | 705/27 |
| 5,930,777 A | 7/1999 | Barber | 705/40 |
| 5,953,707 A | 9/1999 | Huang et al. | 705/10 |
| 5,961,593 A | 10/1999 | Gabber et al. | 709/219 |
| 5,966,697 A | 10/1999 | Fergerson et al. | 705/26 |
| 5,970,472 A | 10/1999 | Allsop et al. | 705/26 |
| 5,970,475 A | 10/1999 | Barnes et al. | 705/27 |
| 5,971,273 A | 10/1999 | Vallaire | 235/381 |
| 5,983,203 A | 11/1999 | Church et al. | 705/35 |
| 5,991,739 A | 11/1999 | Cupps et al. | 705/26 |
| 5,999,908 A | 12/1999 | Abelow | 705/1 |
| 5,999,919 A | 12/1999 | Jarecki et al. | 705/40 |
| 6,002,771 A | 12/1999 | Nielsen | 705/76 |
| 6,006,200 A | 12/1999 | Boies et al. | 705/26 |
| 6,023,683 A | 2/2000 | Johnson et al. | 705/26 |
| 6,032,130 A | 2/2000 | Alloul et al. | 705/27 |
| 6,125,352 A * | 9/2000 | Franklin et al. | 705/26 |
| 6,154,738 A * | 11/2000 | Call | 707/4 |
| 6,185,608 B1 | 2/2001 | Hon et al. | 709/216 |
| 6,209,029 B1 | 3/2001 | Epstein et al. | 709/219 |
| 6,304,864 B1 * | 10/2001 | Liddy et al. | 706/15 |
| 6,405,175 B1 * | 6/2002 | Ng | 705/14 |

\* cited by examiner

CONTENT AGGREGATION METHOD AND APPARATUS FOR ON-LINE PURCHASING SYSTEM

CROSS-REFERENCE TO RELATED APPLICATIONS

This application is a continuation-in-part of U.S. Application No. 09/566,734, filed May 9, 2000.

BACKGROUND OF THE INVENTION

1. Field of the Invention

The invention relates to systems for purchasing goods and services over a communications network. The invention also relates to an automated purchase support method and apparatus for seamlessly integrating plural merchants into an on-line shopping system. More specifically, the invention is directed to a method and system for aggregating content for an on-line purchasing system.

2. Description of the Related Art

The Internet is a worldwide network of computers linked together by various hardware communication links all running a standard suite of protocols known as TCP/IP (transmission control protocol/Internet protocol). The growth of the Internet over the last several years has been explosive, fueled in the most part by the widespread use of software viewers known as browsers and HTTP (hypertext transfer protocol) which allow a simple GUI (graphical user interface) to be used to communicate over the Internet. Browsers generally reside on the computer used to access content on the Internet, i.e. the client computer. HTTP is a component of TCP/IP and provides users access to files of various formats using a standard page description language known as HTML (hypertext markup language), and more recently XML (extensible markup language) and XHTML (extensible hypertext markup language), a reformulation of HTML into XML. The collection of servers on the Internet using HTTP has become known as the "World Wide Web" or simply the "Web."

Through HTML, XHTML, and interactive programming protocols, the author of a particular Web page is able to make information available to viewers of the Web page by placing the Web page on an Internet Web server. The network path to the server is identified by a URL (Uniform Resource Locator) and, generally, any client running a Web browser can access the Web server by using the URL. A client computer running a browser can request a display of a Web page stored on a Web server by issuing a URL request through the Internet to the Web in a known manner. A URL consistent with the present invention may be a simple URL of the form:

<protocol identifiers>://<server path>/<web page path>

A "protocol identifier" of "http" specifies the conventional hyper-text transfer protocol. A URL request for a secure Internet transaction typically utilizes the secure protocol identifier "https," assuming that the browser running on the client and the Web server control program running on the Web server support and implement the secure sockets layer discussed below. The "server path" is typically of the form "prefix.domain," where the prefix is typically "www" to designate a Web server and the "domain" is the standard Internet sub-domain.top-level-domain of the Web server. The optional "web page path" is provided to specifically identify a particular hyper-text page maintained on the Web server. In response to a received URL identifying an existing Web page, the Web server can return the Web page, subject to the HTTP protocol, to the client computer for display on the client computer. Such a Web page typically incorporates both textural and graphical information including embedded hyper-text links that permit the user of the client computer to readily select a next URL or send other data over the Internet. Further, a Web page can have embedded applets, written in Java TM or another programming language, to present animation and/or audio.

The URL issued from the client computer may also be of a complex form that identifies a CGI (common gateway interface) program (or script) on the Web server. The CGI program permits interactivity between the client computer and the Web server via HTTP. CGI is a standard for external gateway programs to interface with information servers, such as Web servers. A plain HTML document that the Web server delivers is substantially static. A CGI program, on the other hand, is executed in real-time so that it can process data or execute commands, such as executing a buy procedure which authorizes a purchase of products through a commerce Web server. A HTML form definition reference that identifies a CGI program is commonly of the form:

<form action-http://www.vendor.com/cgi-bin/buy.cgi method=post>

A hyper-text link of this form directs the execution of the buy.cgi program on the Web server in response to a command from the client computer. For example, buy.cgi can be a buy procedure of the Web server. The Web has become ubiquitous in businesses and homes because it has proven to be convenient for various applications, such as news and data delivery, conducting banking and investment transactions, and the like. The Web and its authoring, transmission, and display protocols, such as browsers, HTML, CGI, Active Server PagesTM, and JavaTM, have become a worldwide standard for information exchange.

As known and appreciated in the art, there are presently millions of Web pages with various content. Tools have been developed to allow the user to search these Web pages to obtain the various Web pages having the various content of interest. One way to locate the desired Web pages is to use a "search engine" which will search for Web pages having a particular keyword or key words. Search engines typically have three components: a crawler (such as a robot, bot or automated site searcher), an index, and a software program which presents the results of the search to the user. The crawler automatically "crawls" from Web server to Web server and the sites hosted therein to gather URLs and other information such as the text of the page that the search engine can use in the searches for keywords. When the information gathering by the crawler is completed, the information regarding the Web pages is stored in the search engine's databases and indexed. When a user seeking information from the Web types in a keyword(s) in a search field of the search engine, the search engine's software program then utilizes algorithmic functions and criteria to find keyword matches in the information stored in the databases. Some programs search all of the text of each page while other programs merely search the URLs and/or titles of the pages. The software program then sorts through the results of the search and provides a prioritized results to the user based on relevancy of the Web page. Various search engine software programs differ in their methods used for determining a Web page's relevancy. For example, the software may view the "meta tag" of the page, include a counter for counting the number of keyword occurrences on the text of the page, and/or consider the Web page's popularity as well as other factors such as whether the Webmaster of the Web page has made special arrangements to have the Web page displayed as a result of the search.

One of the primary applications of the Web has been shopping, i.e. the purchase of goods and services, i.e. products. Virtually every major commercial "bricks and mortar" merchant has established a Web site for the showcase and sale of their products. Further many manufacturers sell produces directly over the Web. Finally, a plethora of on-line merchants, not previously existing in the bricks and mortar world, have come into existence. As a result, virtually every product is available for purchase over the Web from a plurality of merchants. This situation has increased the efficiency of markets by permitting shoppers to readily compare products and terms of sale from plural merchants without the need to travel physically to the merchant locations.

However, in order to compare products and terms of different merchants, one must "visit" the various merchant web sites individually. First, this requires knowledge of the URLs for each merchant Web site or the use of a search engine which can be cumbersome and inaccurate. It is possible to open the various sites in different browser windows for better comparison. However, the various formats of each merchant Web site render it tedious to compare products and terms directly. When a purchase decision is made, the purchase or purchases must be made through the individual merchant Web sites. Further, ordinarily the shopper is required to log in to each merchant Web site, by entering a username and password for example, prior to making a purchase and then proceed to the next site. For example, if the shopper decides to buy three items from three different merchants, three log in procedures and three buy procedures, i.e. procedures for effecting a purchase on the merchant Web sites, must be manually executed respectively through the three merchant Web sites and their proprietary interfaces.

Recently, it is known to integrate a plurality of web sites into a single environment known as a "shopping portal." Shopping portals ordinarily include a Web server presenting an integrated interface displaying plural products from various merchants. Accordingly, conventional shopping portals facilitate comparison shopping and thus increase market efficiency. However, conventional shopping portals merely serve as a gateway to the individual merchant Web sites. In particular, when a purchasing decision is made, the shopper is directed to the merchant Web site and the purchase is completed manually through the merchant Web site using the merchant Web site buy procedures and interface. Accordingly, when purchases are made from more than one merchant, conventional shopping portals require that the shopper execute the orders using different interfaces at the respective merchant Web sites.

U.S. Pat. No. 5,895,454 discloses an interface for merchant Web sites. A shopper connects to a remote merchant Web site through a shopping server. When a product is selected from a merchant server, a transaction notification is transmitted to a database on the shopping server. When the shopper is finished shopping, the shopper server transmits purchase orders corresponding to the selected products to the merchant web sites to complete the orders on behalf of the shopper. However, the system disclosed in U.S. Pat. No. 5,895,454 requires that the shopper navigate each merchant Web site individually to select products for purchase and thus, fails to address the complexities of content aggregation.

Therefore, there exists an unfulfilled need for a way to seamlessly integrate plurality of on-line merchants into a single shopping interface to thereby facilitate comparison shopping in an on-line environment. There also exists an unfulfilled need for a way to provide important product information to the shopper to facilitate an informed purchase decision by the shopper and for a method for efficiently gathering such product information from a networked computer environment.

SUMMARY OF THE INVENTION

It is an object of the invention to seamlessly integrate plural on-line merchants into a single shopping interface.

It is another object of the invention to facilitate comparison shopping in an on-line environment.

It is another object of the invention to provide important product information to the shopper to facilitate an informed purchase decision by the shopper.

It is another object of the invention to provide a method for efficiently gathering product information from a networked computer environment.

It is another object of the invention to provide a method for gathering product information from various sources including manufacturer's product specification sources and merchant's information sources.

It is still another object of the invention to provide a method for accessing and utilizing the gathered product information to effect commerce in a networked computer environment to facilitate purchase decision of the shopper.

These and other objects are achieved by a method of aggregating product information from a plurality of sources in a networked computer environment regarding products of a product category comprising the steps of causing a crawler originating from a server interconnected to the network computer environment to visit the plurality of sources and gathering product phrase information from each of the plurality of sources via the crawler, where the crawler utilizes computational linguistics to gather the product phrase information which includes a phrase and at least one characteristic of the phrase. The characteristics of the phrase may be at least one of frequency, location, font size, font style, font case, font effects, font color, collocation and co-occurrence of the phrase in each of the plurality of sources. In addition, the plurality of sources may include at least one of a manufacturer's product specifications source, a product literature source, and a merchant's information source. The crawler may include a product literature crawler as well as a product offerings crawler. The method in accordance with one embodiment of the present invention may also include the step of applying statistical analysis to the product phrase information to rank each phrase and the step of determining whether each phrase is a product property. The method may further include the steps of determining whether each product property is evaluative, numeric or discrete and the product properties may also be ranked. Moreover, the method in accordance with another embodiment of the present invention may including a validation step where information stored in a product offerings database is cross-referenced with information stored in a products database to determine whether any products identified in the product offerings database is absent from the products database. A new product record may then be created in the products database based on information stored in the product offerings database.

Yet another aspect of the present invention is a computer architecture for executing the above described aggregation method and for allowing shoppers to utilize product information to make an informed purchase of goods and services over a communications network.

BRIEF DESCRIPTION OF THE DRAWING

The invention is described through a preferred embodiment and the attached drawing in which.

DETAILED DESCRIPTION OF THE PREFERRED EMBODIMENT

Figure 1:
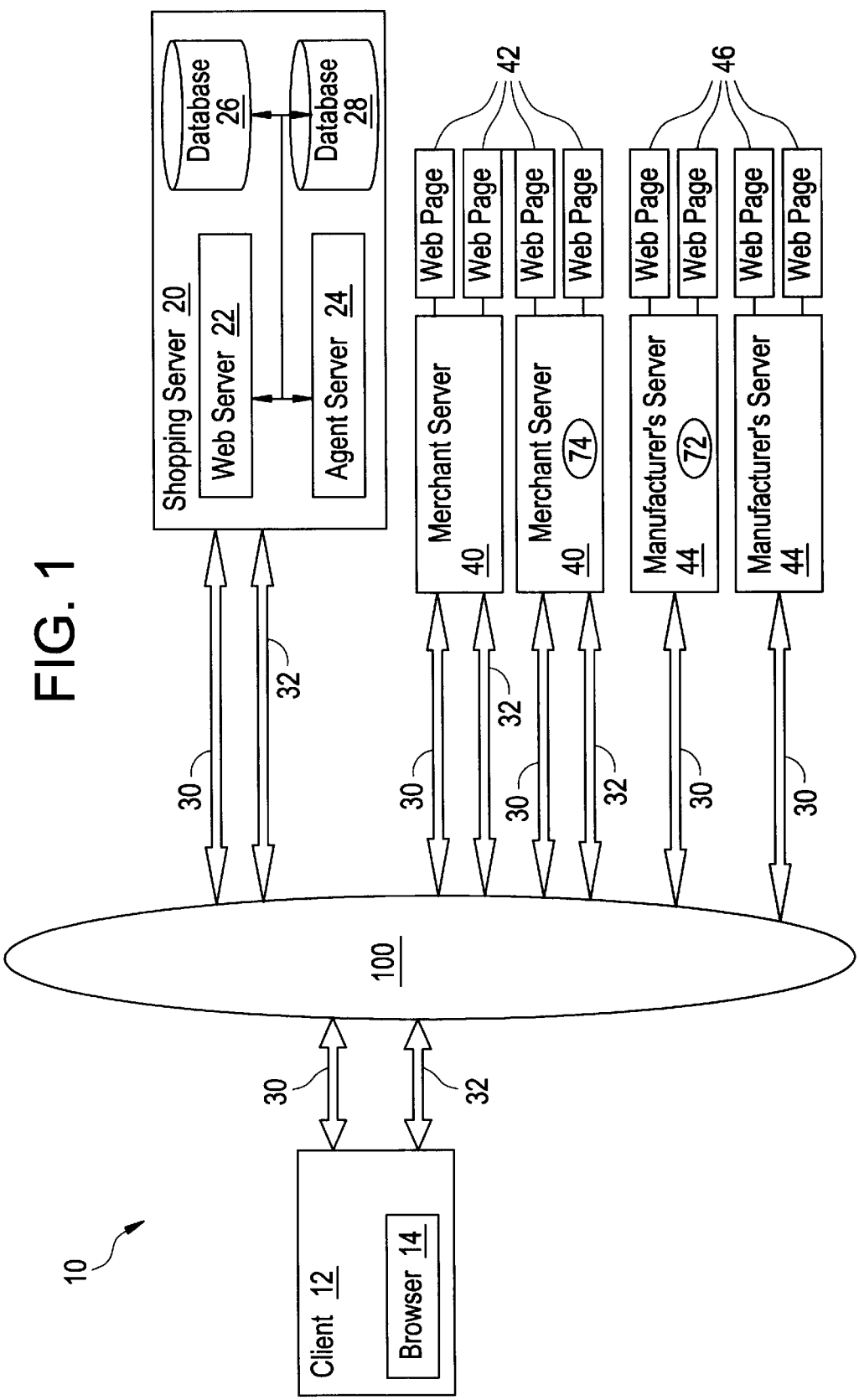
FIG. 1 is a block diagram of a computer architecture in accordance with the preferred embodiment of the invention including a plurality of manufacturers' servers.

A preferred embodiment of a computer architecture of the invention is illustrated in FIG. 1. Commerce system 10 includes client computer 12 executing browser application 14 that supports the HTTP protocol. Client computer 12 is connected, typically through an ISP (Internet Service Provider), to Internet 100 serving as a communication channel. For example, client computer system 12 can be coupled to the ISP via a conventional dial up connection using a modem or through a broadband connection such as ISDN (Integrated Services Digital Network), a cable modem, or a DSL (Digital Subscriber Line) connection. Shopping server 20 is also coupled to Internet 100 in a known manner. Shopping server 20 executes a Web server control application 22, known as an HTTP server application, stored in a memory device. For example, public domain web server software applications from NCSA or APACHE can be used.

Shopping server 20 also executes agent server control application 24, (the function of which is described in detail below) utilizing a secure connection for privacy. Agent server control application 24 can utilize SSL (secure sockets layer), S-HTTP (secure HTTP), or any other type of secure connection (standard protocols for transmitting private documents via the internet). SSL works by using a private key to encrypt data that is transferred over the SSL connection. It is common for Web sites to use SSL to obtain confidential user information, such as credit card numbers. As noted above, Web pages that require an SSL connection have a URL starting with "https:" instead of "http:." Whereas SSL creates a secure connection between a client and a server over which any amount of data can be sent securely, S-HTTP is designed to transmit individual messages securely.

A plurality of merchant servers 40 provide on-line shopping using conventional commerce server control applications, i.e. software that runs some of the main functions of an online storefront such as product display, online ordering, and inventory management. Merchant servers 40 and commerce server software are well known and thus are not described in detail herein.

In the preferred embodiment, each of client computer 12, shopping server 20, and merchant servers 40 are capable of communicating using a secure connection protocol, such as SSL or S-HTTP. For clarity, non secure connections 30 and secure connections 32 are illustrated separately. However, typically, these connections will be effected over the same physical connection or communication channel, such as Internet 100. Further, shopping server 20 and merchant servers 40 can have many Web pages stored in memory devices thereof as files in HTML format and/or other formats. Shopping server 20 also includes product database 26 and shopper database 28 stored in a memory device thereof as described in detail below.

Client computer 12 can request a display of a Web page stored on shopping server 20 by issuing a URL request through Internet 100 to shopping server 20. For example, a user of client computer 12, i.e. a shopper, can select a product, or plural products, for purchase by navigating Web pages stored on shopping server 20 and populated with product information from product database 26. Product database 26 can include product descriptions, pricing, delivery dates, and other product information for plural merchants and culled from merchant servers 40 using automated Web crawlers as described in detail below. The product information in product database 26 should be updated periodically to correspond with current product information on merchant servers 40. However, as will become apparent below, the product information need not be updated in real time.

The product information can be searched and displayed by product type, part numbers, price, keywords, or product features in any desirable manner using an interface of shopping server 20 as presented to the shopper by browser application 14 on client computer 12. The product information in product data base 26 relating to products from plural merchant servers 40 can be displayed side by side in the browser window of client computer 12 to permit the shopper to comparison shop and choose products from any one or more of merchant servers 40 based on the product information. For example, the user may search for all instances of a particular item by product name or part number and may select for purchase the instance from the merchant having the lowest price. For example, the shopping interface known as SMARTSHOP.COM™ can be used in connection with the invention. Upon logging in to shopping server 20, by entering a username and user id as identification data for example, a user can be identified and thus can avoid the need for reentering previously registered data and preferences.

Figure 2:
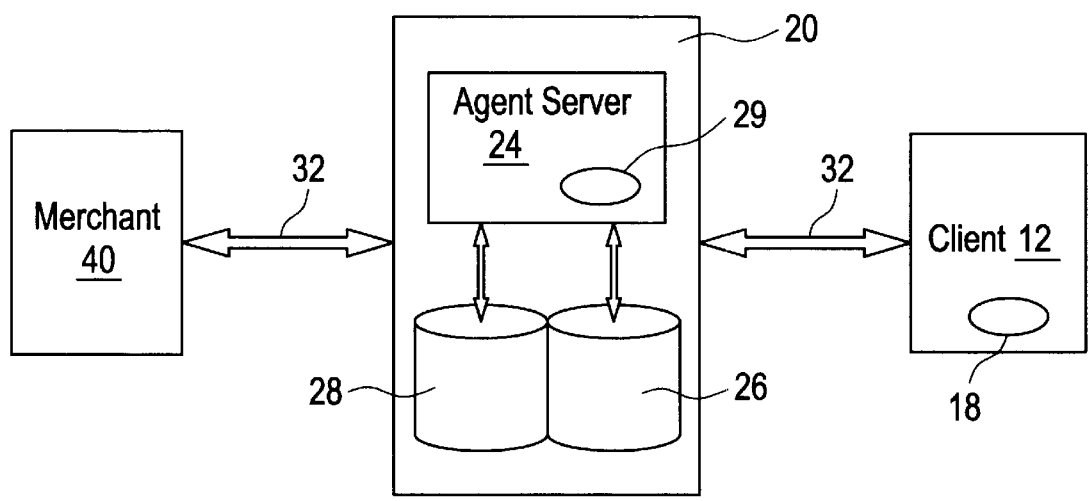
FIG. 2 is a block diagram of a portion of the architecture of FIG. 1 schematically illustrating the communication channel connections for an automated purchase procedure.

FIG. 2 schematically illustrates the communications channel connections of the preferred embodiment during an automated purchasing procedure. For the sake of clarity, the remaining description refers generally to only one merchant server 40. However, it should be understood that the procedure described below can be accomplished for plural products from plural merchant servers 40. When a user selects a product for purchase, by clicking on a "buy" button for example, secure connection 32 is established between client computer 12 and agent server application 24 of shopping server 20. Agent server application 24 then opens parallel secure connection 32 with the commerce server application of merchant server 40. Secure connections 32 are illustrated as direct connections between computers for clarity. However, it should be understood that secure connections 32 can be SSL connections over Internet 100 or any other type of communication channel.

Figure 3:
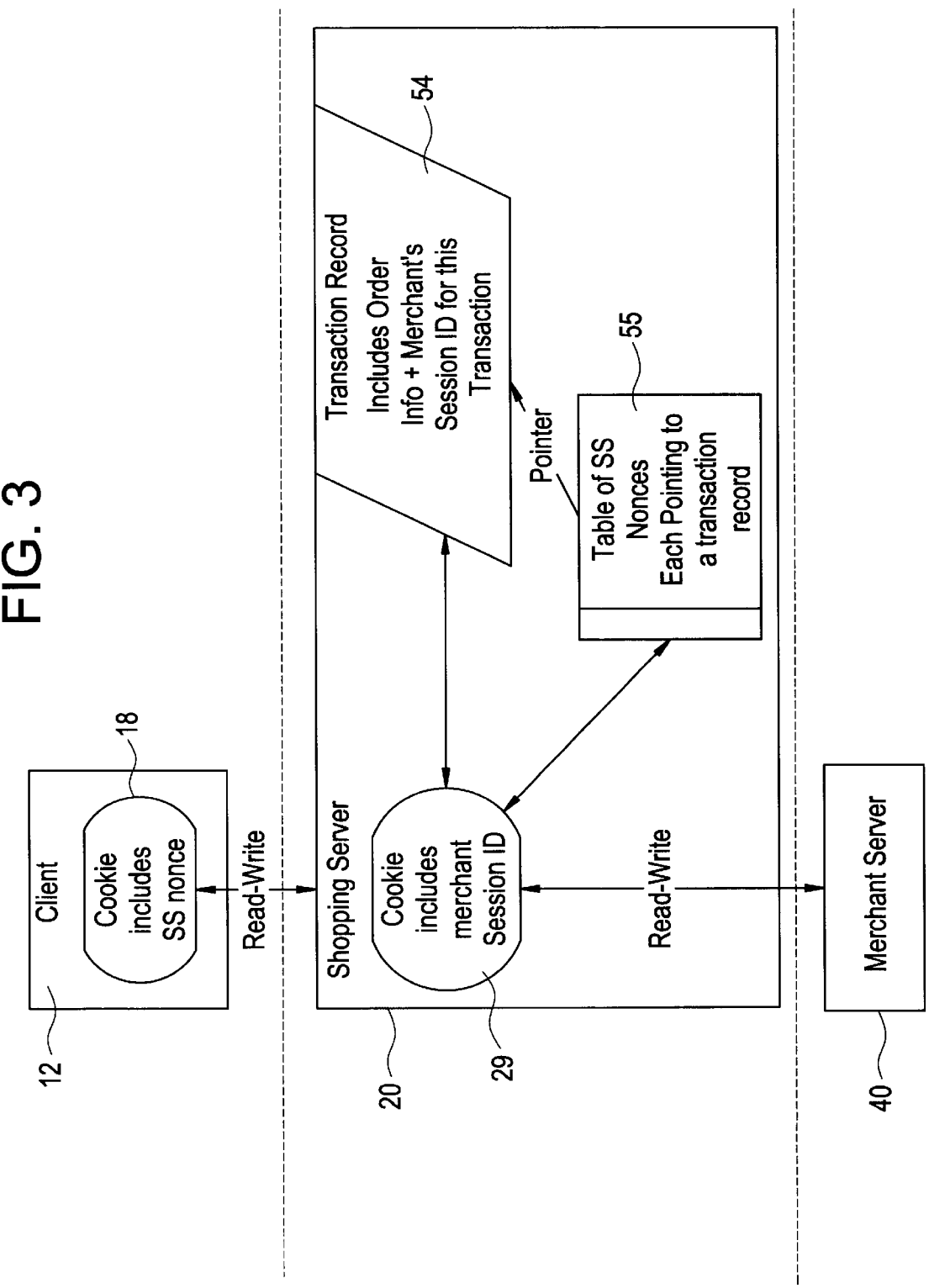
FIG. 3 is a block diagram of the cookie handling procedure of the preferred embodiment.

Also, as illustrated in FIG. 2, first "cookie" 29 (i.e. a file containing information, such as identification information, to be used by a server) is established on shopping server 20 and second cookie 18 is established on client computer 12. First cookie 29 allows merchant server 40 to track status of its order acceptance process and second cookie 18 allows shopping server 20 to track status of its order placement process. With reference to FIG. 3, first cookie 29 contains information identifying the order acceptance session between shopping server 20 and merchant server 40, i.e. a merchant session ID. The identifying information can be any character string or code by which merchant server 40 can identify the order acceptance session. Similarly, second cookie 18 contains a "nonce" (i.e. a one-time random string), or other information identifying the order placement session between client computer 12 and shopping server 20. Shopping server 20 maintains record 55, such as a database or a lookup table, that associates the nonce of second cookie 18 with the corresponding transaction record 54 (see description of FIG. 4 below), by pointing to the transaction record 54 for example. Changes in transaction reporting from merchant server 40 are recorded in transaction record 54 because the two are synchronized by virtue of pointers from the nonces to transaction record 54. Transaction record 54 also contains the corresponding merchant session ID. Accordingly, when the shopper resumes an idle session, such as by confirming an order through client computer 12, shopping server 20 examines second cookie 18 and identifies the corresponding order placement session and status and is thus able to resume the session in a secure manner. Further, shopping server 20 will locate the corresponding first cookie 29 and present it to merchant server 40 to resume the corresponding order acceptance session.

Keep in mind that there typically are a plurality of order placement and corresponding order acceptance sessions occurring simultaneously. The cookie management procedure described above allows all sessions to be correlated properly and thus permits a seamless shopping experience. Shopping server 20 uses information stored in shopper database 28 to act on the shopper's behalf during execution of a buy procedure of merchant server 40. Shopper database 28 can include any appropriate information about registered shoppers, such as their name, address, shopping preferences, credit card numbers, merchant account information (such as a username and user id for the shopper at each particular merchant), and the like. Of course all data in shopper database 28 can be collected during a registration procedure and encrypted for security in a known manner.

Figure 4:
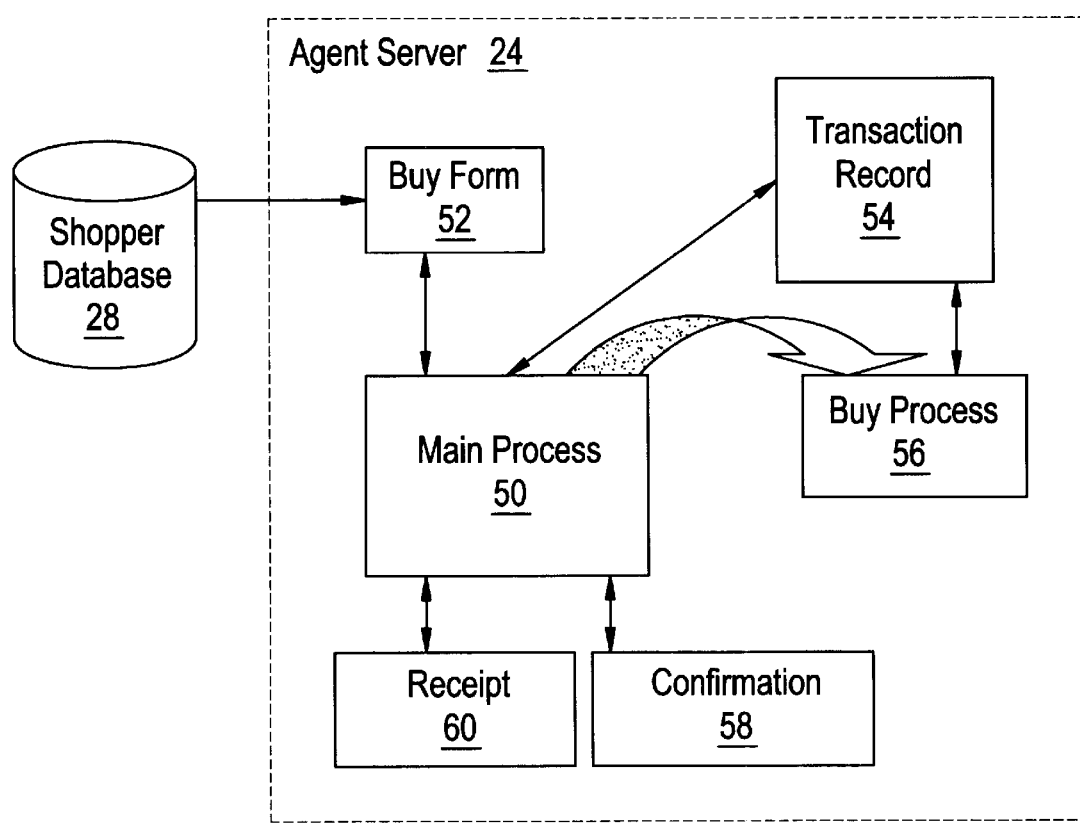
FIG. 4 is a schematic representation of the internal automated purchase procedure of the shopping server of the preferred embodiment.

FIG. 4 illustrates the purchase procedure, i.e. the function of agent server 24, of shopping server 20 in greater detail. Keep in mind that the purchase procedure ordinarily begins after the shopper has logged in to shopping server 20 or otherwise identified themselves uniquely. The first phase of the purchase procedure permits the shopper to search products, browse for products in various ways, and select one or more products for purchase from one or more merchant servers 40. After logging in, main process 50 of agent server control application 24 generates buy form 52 for display to the shopper. In the event that the shopper desires to change information in buy form 52 for the current purchase procedure, the shopper can merely edit buy form 52. For example, the shopper may wish to change the shipping address or shipment method. Of course, the shopper profile can be edited to change the default shopper information in shopper database 28. Buy form 52 is automatically pre-filled with default shopper information corresponding to the shopper if such information exists as a shopper profile in shopper database 28. If such information does not exist for the shopper, the shopper can be prompted to enter the information and the information can be used in the current purchase procedure. Main process 52 also creates transaction record 54 which keeps track of all transaction information, including transaction status, for the current transaction procedure (such as credit card information, billing addresses, and the like from shopper database 28 and merchant SKUs of selected products, shipping options, and the like from product database 26).

Also, main process 50 spawns buy process 56 and points buy process 56 to the corresponding transaction record. As the shopper selects various products and options using the browser interface of client computer 12, transaction record 54 is updated. Note that, at any given time, there can be plural purchase procedures for plural shoppers each having a respective buy process 56 and corresponding transaction record 54. Buy process 56 will continue to run in parallel with main process 50 until the purchase procedure is completed. Buy process 56 continually updates transaction record 54 based on shopper selections. Meanwhile, main process 50 polls transaction record 54 for updated status. In this manner, main process 50 is updated with the status of each purchase procedure.

When the first phase of the purchase procedure is complete, i.e. the shopper has selected all desired products and options from all desired merchants, main process 50 presents confirmation page 58 to the shopper, through the browser interface of client computer system 12, for verification of an order by the shopper. Confirmation page 58 is generated by communication between shopping server computer system 20 and the appropriate merchant server 40 using secure connection 32 between shopping server computer system 20 and the appropriate merchant server 40. In particular, shopping server computer system 20 uses the information in transaction record 54 to verify pricing information, shipping information, and other details of the desired purchase with merchant server 40 by automatically going to each merchant checkout page, or other information page, and retrieving the updated information. Buy procedures of merchant server 40 are integrated into buy processes of shopping server 20 to allow buy process 56 to automatically navigate merchant server 40. Back end test scripts or the like can be used to determine the particular buy procedure steps of merchant server 40.

If account information for a particular merchant exists for the shopper in shopper database 28, that account information is used when executing the buy procedures with the merchant server 40. If not, a new account is created for the shopper with the merchant and the account information is stored in shopper database 28 for subsequent use. Since shopping server 20 uses merchant account information that corresponds to the shopper, the shopper can retain preferred buyer points and other benefits and discounts as if shopping directly at merchant server 40.

Keep in mind that, in the preferred embodiment, up to the time of generating confirmation page 58 communication has been between client computer system 12 and shopping server 20 using information from product database 26, which might not be entirely updated due to the fluid state of on-line commerce. Accordingly, confirmation page 58 includes real-time pricing and shipping information obtained from merchant server 40 for each selected product in transaction record 54. Upon receiving shopper confirmation of the order summarized in confirmation page 58, all transaction information in transaction record 54 is saved and second cookie 18 is saved to allow the procedure to restart later on with the same user session. Buy process 56 remains idle while waiting for the shopper to confirm the order by selecting a button on confirmation page 58 or taking other action.

In the second phase of the purchase procedure, the purchase transaction is completed. In particular, second cookie 18 is used to resume the previous user session on merchant server 40. Subsequently, the order is executed on merchant server 40 using information in transaction record 54 to run a buy procedure and thus execute a buy process, on merchant server 40. The order is then confirmed on shopping server 20, transaction record 54 is updated and receipt page 60 is generated showing the transaction information and confirmation numbers and the like from merchant server 40. Once again, it is important to note that products can be selected from plural merchant servers 40 and, in such a case, plural buy procedures will be executed and confirmed on the respective merchant servers 40 using the appropriate shopper account information automatically for each merchant server 40.

It can be seen that the purchase procedure discussed above permits shopping server 20 to act on as an agent behalf of the shopper in interactions with merchant servers 40. However, some merchants do not feel comfortable with shoppers using an agent Web site. In particular, many merchants rely on advertising, affiliate programs, and the like in their business model and thus can only accomplish their business objective if the shopper "visits", i.e. directly views, their Web site and its buy pages in particular during shopping. Accordingly, a proxy server mode of shopping server 20 can be used, to offer many of the advantages of the integrated purchasing procedure disclosed above, while satisfying vendors that desire to have the shopper visit their Web site buy pages.

Internet proxy servers are well known. The phrase "proxy server" refers generally to a server that sits between a client application, such as a Web browser, and a Web server to intercept requests. The proxy server then serves up substantially the same content as the Web server to which the request was directed while also performing an auxiliary function such as filtering data, monitoring data, or serving up a cached copy of the Web page. In the preferred embodiment, this general concept is expanded and applied to an integrated shopping environment. In proxy server mode, parallel secure connections 32 are set up between client computer and shopping server 20 and between shopping server 20 and merchant server 40, as illustrated in FIG. 2. The first phase of the purchase procedure is accomplished in the same manner as described above with respect to the standard mode. To utilize proxy server mode, merchant database 28 preferably includes form maps for mapping fields in the order forms of merchant server 40 to fields in shopper database 26. An external editing tool can be provided to develop the form maps in a known manner. For example, the editing tool can be configured to read the HTML forms and parse out the data fields. These data fields can then be correlated to corresponding fields in custom database 28.

During the second phase of the purchasing procedure, when client computer 12 requests a Web page from merchant server 40, shopping server 20 (in proxy server mode) handles the request and filters out the HREFs, i.e. HTML document references, and POSTs, i.e. HTML form submissions, to point to shopping server 20 instead of merchant server 40. When merchant server 40 sends a blank form to client server 12, the form is intercepted by shopping server 20 and the form is filled out with information from shopper database 26. When client computer 12 posts a form back to merchant server 40, shopping server 20 reproduces the post keeping intact all changes in the form content made by the shopper. First cookie 29 and the second cookie 18 track the sessions as described above.

In proxy server mode, when the shopper selects a buy button from confirmed page 58 or another page displayed on client computer 12, the shopping cart page, or other buy page, of merchant server 40 is displayed. The shopper manually executes the buy procedure of merchant sever 40 using the interface of merchant server 40 as displayed on client computer 12. This manual procedure is accomplished for each merchant server 40 requiring the proxy mode. Accordingly, in proxy server mode, the shopper views all the buy pages and executes the buy procedures on merchant server 40. However, shopping server 20 mediates and assists in filling out forms. Other aspects of the purchase procedure using proxy server mode can be similar to the purchase procedure described above without proxy server mode.

The invention facilitates on-line commerce by permitting an integrated buying experience from plural merchants. The invention can be implemented over any type of communications channel, such as the Internet, a local area network (LAN), a wide area network (WAN), direct computer connections, or the like, using any type of communication hardware and protocols. Any type of hardware or combination of hardware can be used for the various clients and servers. Accordingly, the term "computer" as used herein, refers to any type of computing device or data terminal, such as a personal computer, a portable computer, a dumb terminal, a thin client, a hand held device, a wireless phone, or any combination of such devices. The various clients and servers can be a single computer at a single location or multiple computers at a single or multiple locations. For example a server may be comprised of a plurality of redundant computers disposed in co-location facilities at various locations to facilitate scalability. Any appropriate server or client software can be used and any communication protocols can be used. Communication can be accomplished over electric cable, fiber optic cable, any other cable, or in a wireless manner using radio frequency, infrared, or other technologies. Any interface can be used for selecting products for purchase. The various information can be stored in any format and thus the term "database" as used herein refers to any collection of information such as a database file, a lookup table, or the like.

As noted, product database 26 can include product descriptions, pricing, delivery dates, and other product information for plural merchants. Such product information may be culled by using automated crawlers as described below and updated periodically to correspond with current products available on merchant servers 40. The term "crawler" as used herein refers to any software that performs searches of content over a network and can include "bots", "robots", "automated site searchers" and the like. Referring again to FIG. 1, commerce system 10 includes client computer 12 executing.,browser application 14 and shopping server 20 which executes agent server control application 24, client computer 12 and shopping server 20 being connected to Internet 100 which serves as a communication channel. In addition, in the preferred embodiment, plurality of manufacturer's servers 44 are also connected to Internet 100 via non secure connections 30. In this regard, shopping server 20 may be used to aggregate product information from a plurality of sources connected to Internet 100 regarding products of a product category and store the aggregated information in product database 26. However, it should be noted that the aggregation of product information may be attained using a computer that is separate from the computer running agent server central application 24 and the resulting information can be made available to the computer running agent server central application 24.

The plurality of sources may include plurality of merchants' information sources and manufacturers' product specification sources that are hosted in merchants' servers 40 and manufacturer's servers 44 respectively. It should be appreciated that in the preferred embodiment, the plurality of merchants' information sources are merchants' Web pages 42 and the manufacturers' product specification sources are manufacturers' product specification Web pages 46. Additional sources may also be provided such as product literature sources which may be product literature Web pages that review and provide additional information regarding a product or products of a product category. In fact, the manufacturers' product specification sources can be considered to be merely a subset of the product literature sources. Also, when manufacturer's sell products directly over Internet 100, manufacturer's servers 44 are one in the same as merchant's servers 40.

In accordance with the preferred embodiment, the shopping server 20 is operative to provide at least one crawler for visiting the plurality of sources hosted by merchants' servers 40 and manufacturer's servers 44 to aggregate product information from these plurality of sources regarding various products of a product category. In this regard, the crawler may include product literature crawler 72 that gathers product phrase information from the manufacturer's product specifications Web pages hosted by manufacturer's server 44. The crawler may also include product offerings crawler 74 that gathers product phrase information and pricing information of each of the products in the product category from the merchant's Web pages hosted by merchant's servers 40. Of course, it should also be noted that product literature crawler 72 may also visit merchant's Web pages and product offerings crawler 74 may also visit manufacturer's product specifications Web pages. Moreover, a single crawler may be provided to perform the functions of both product literature crawler 72 as well as product offerings crawler 74.

In the preferred embodiment, product literature crawler 72 and/or product offerings crawler 74 may gather information regarding a manufacturer's identity and product model, as well as the product phrase information which preferably includes a phrase and at least one characteristic of the phrase from each of the plurality of sources by utilizing computational linguistics. It should be understood that the term "phrase" which is gathered by crawlers 72 and 74 refers to an alpha-numeric character string or strings present in a source such as manufacturer's product specifications Web pages 46, merchant's Web pages 42, and/or product literature Web pages (not shown). The term "characteristic" refers to some attribute of the alpha-numeric character string in the Web page. For instance, the characteristic of the phrase may be its frequency, location, font size, font style, font case, font effects, and font color of the phrase in the Web page as well as the frequency of collocation (phrases immediately next to each other) and co-occurrence of phrases (phrases within a predetermined words of each other). Moreover, the term "computational linguistics" is used herein to refer to a cross-disciplinary field of modeling of language utilizing computational analysis to process language data such as any of the above noted characteristics of the phrase. In the preferred embodiment, crawlers 72 and 74 and the computational linguistics used thereby are software programs designed to execute the functions described. Thus, by utilizing computational linguistics, product literature crawler 72 and/or product offerings crawler 74 gathers product phrase information which may be processed and used in the manner described below.

Figure 5:
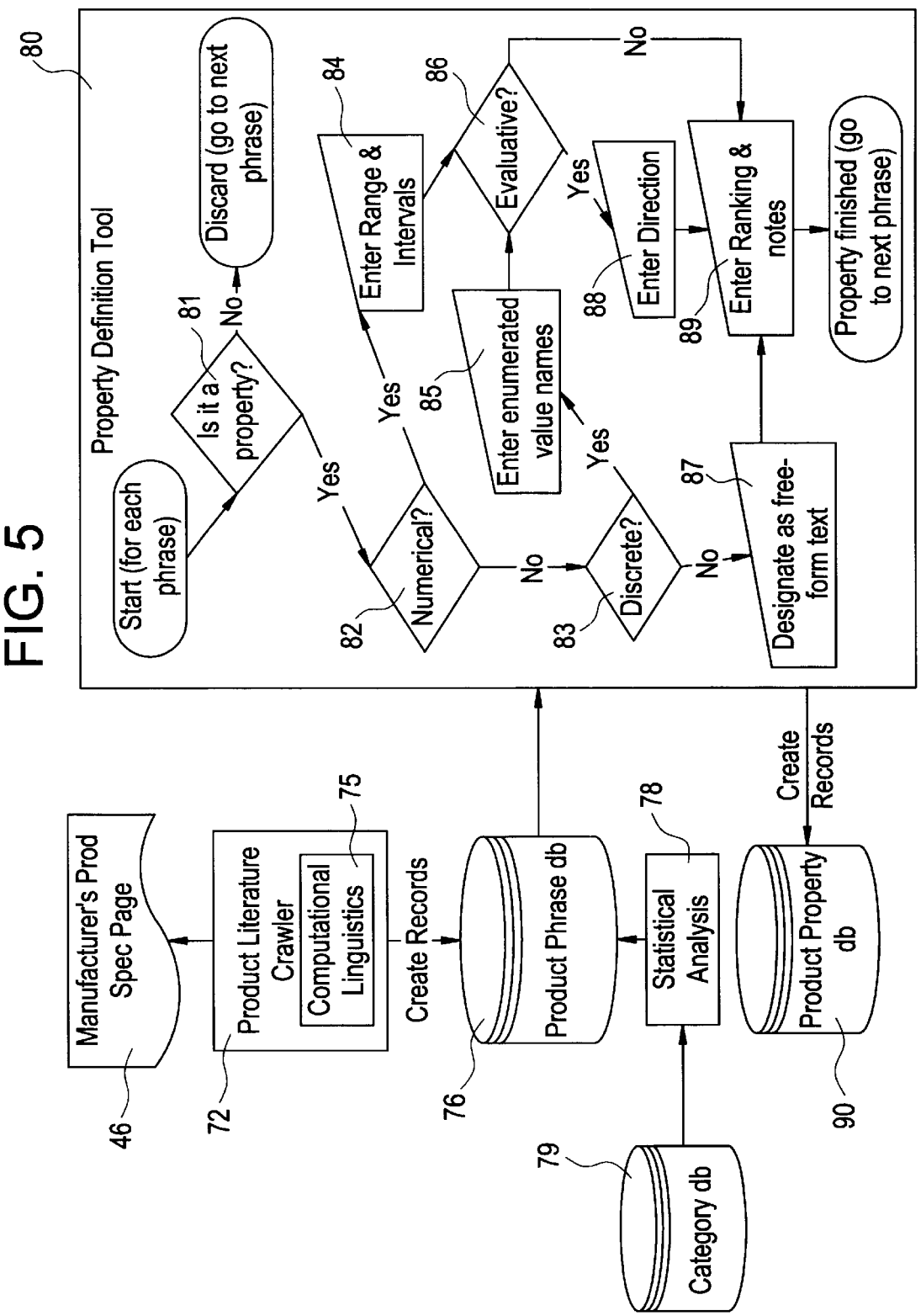
FIG. 5 is a block diagram of a method in accordance with one embodiment of the present invention for processing the gathered product property information from the plurality of manufacturers' servers.

In accordance with the above discussion, FIG. 5 illustrates the method of the preferred embodiment of the present invention where product literature crawler 72 obtains product phrase information utilizing computational linguistics module 75. The obtained product phrase information (i.e. the phrase and the characteristic of the phrase) are then stored in product phrase database 76 for further analysis. Commerce system 10 of FIG. 1, via shopping server 20 or by other means such as another computer/server, is operable to further analyze the product phrase information using statistical analysis module 78 to thereby provide a ranking of the product phrases in any given product category. These ranked product phrases will typically represent commonly found product properties of a given product or product category and are also stored in the product phrase database 76.

In addition, as will be described in further detail below, the preferred embodiment of the present invention utilizes property definition tool 80 to analyze the stored product phrase information to thereby determine whether each of the product phrase information in product phrase database 76 is in fact a product property. It should be understood that the term "product property" or "product properties" is a word or phrase that descriptively characterizes the product or product category. Property definition tool 80 of the preferred embodiment is a software algorithm illustrated as steps in FIG. 5.

Thus, for example, product literature crawler 72 may examine the content of Web page 46 of manufacturer's server 44 such as a computer manufacturer (or other server having a product literature source) to obtain product phrase information provided on the Web page including the phrase and the characteristic(s) of the phrase as well as information provided in the Web page's URL address and any meta tags. This product phrase information can then be stored in product phrase database 76 for further analysis. In this example, the computer manufacturer's home Web page will likely have a meta tag including the phrase "computer" as well as the phrase "computer" throughout its home Web page which may or may not have special characteristics such as formatting and positioning which distinguishes the phrase from the remainder of the text on the Web page. Because of the use of computational linguistics module 75, product literature crawler 72 is able to recognize and obtain such information regarding the phrase "computer" such as its presence in the home Web page's meta tag, frequency in its home Web page, and its other special characteristics to thereby statistically discern that the home Web pages relates to computers and that the Web pages linked to the home Web page will also likely relate to computers and consequently, determine that this phrase is a product property, in particular, a product category.

More preferably, product literature crawler 72 may also crawl through a substantial portion of the linked Web pages prior to determining whether the phrase is a product property to ensure accurate determination. For instance, product literature crawler 72 may crawl through the plurality of Web pages linked to the home Web page to gather product phrase information and in the present example, will further likely identify presence of the phrase "computer" as well as other phrases known to be associated with a given product category such as phrases "Mb RAM" which is a collocated phrase, "MHz", "floppy", and/or "Gb", etc. Based on analysis of the frequency and characteristics of such phrases by statistical analysis module 78, the phrase "computer" can be determined to be a product property that defines a product category. In this regard, separate category database 79 may be provided with various product categories and the likely associated key word phrases which may be cross referenced to ensure the accuracy of the product category determination. Furthermore, in addition to, or as an alternative to category database 79, a human verification process may be provided to further ensure accuracy of the product category determination.

In addition, the plurality of Web pages linked to the home Web page will also typically include alpha-numeric character strings that identify other important characteristics of the product or product category. Again, it should be noted that such significant character string will often be distinguished from the remaining text of the Web page by its location on the Web page, formatting or other characteristic of the character string. For instance, the character strings may be positioned near the top or the left hand side of the Web page and have a larger font size than most of the other character strings on the Web page. In this regard, such significant character strings may have a prominent font size, font style (such as bold), or font effects (such as italicizing and/or underlining), etc. Referring to the present examples of computers, important attributes/characteristics of computers such as its speed and capacity are likely to be indicated by a numeric string followed by phrases such as "Mb RAM", "MHz", "Gb", etc. Because of the use of computation linguistics module 75, product literature crawler 72 is able to recognize and obtain the phrase and characteristic(s) of the phrase, such as its frequency, location, font size, font style, font case, font effects, font color, collocation or co-occurrence as product phrase information. Such information can be retained in product phrase database 76 and statistical analysis module 78 can then be used provide a ranking of the phrases in any given product category and also stored in product phrase database 76. In particular, statistical analysis module 78 will recognize that a particular phrase was emphasized by the presence of one or more characteristic(s) and consequently, provide a higher ranking for the particular phrase than other phrases that do not have a characteristic associated with it.

In the preferred embodiment of the illustrated invention, the ranked listing of the phrases in product phrase database 76 can then be further analyzed by property definition tool 80 to determine whether the phrases in the product phrase information are in fact relevant product properties that descriptively characterize the product or product category. It should be noted that, preferably, property definition tool 80 is executed by a human editor so that common sense judgments can be made relative to the ranked phrases which were generated utilizing a computer and statistical analysis module 78. However, a computer or other logic device may be used to automate/semi-automate the function of property definition tool 80.

As can be seen in FIG. 5, property definition tool 80, the determination of whether the phrases in the product phrase information are product properties is executed in step 81, preferably by a human editor. If the phrase is determined to be not a relevant product property, the phrase and the product phrase information is discarded and the next phrase is analyzed. If the phrase is determined to be a product property (i.e. the phrase descriptively characterizes the product or product category), a determination is made as to whether the phrase is a numeric character string as shown in step 82. For instance, in our example of computers, exemplary numeric phrases would be the numbers quantifying RAM, hard drive capacity, processor speed, etc. If the phrase is numeric, a range and interval may be entered if appropriate and recorded for the corresponding numeric phrase in step 84. For instance, relative to RAM, the computer model may be available with 32, 64, 96 or 128 Mb of RAM. In this case, the range would be 32 to 128 Mb and the interval would be 32 Mb.

Then, a determination is made as to whether the numeric phrase is evaluative as shown in step 86, i.e. the numeric phrase is indicative of a quality of the product and/or impacts the desirability of the product. As can be readily appreciated, the number associated with RAM is evaluative because the amount of RAM directly impacts the capacity and desirability of the computer. If the numeric phrase is evaluative, the direction of evaluation is determined as shown in step 88, i.e. whether a higher value is better or a lower value is better. Again, referring to our example, computers with a higher amount of RAM are more desirable than computers with less RAM and thus, a higher value is better and the direction of evaluation is better as the numeric phrase value increases. The direction can be determined manually by a human editor or automatically via a computer or other device by correlation to price for example. Of course, in certain product properties that are numeric and evaluative, a lower value may be better. For instance, a lower value in the weight of a notebook computer would be more desirable than a higher value. Correspondingly, the direction of evaluation facilitates ranking of each of the phrases as shown in step 89. Thus, the numeric phrase "32" would be ranked lower than "64" etc. at least with respect to the product property of RAM. If the numeric phrase is not evaluative, the human editor may enter a ranking for the numeric phrase based on his/her product knowledge and experience in step 89 and the next phrase may be analyzed. Of course, because such a numeric phrase is not evaluative, the ranking for the phrase will likely be low as compared to evaluative numeric phrases.

Referring to the above step 82, if the phrase is not numeric, a determination is made whether the phrase is discrete in step 83 and the enumerated value names for discrete phrase is entered in step 85. For instance, relative to the present example, the phrases "CD-ROM", "CD-R" and "CD-RW" are all discrete phrases that are also properties of a computer. It is then determined whether the discrete phrase is evaluative in step 86. As can be appreciated, these discrete phrases are evaluative in that they are indicative of a quality of the product and/or impact the desirability of the product since each of these CD memory devices provide different level of functionality to the computer as known in the computer arts. In this regard, property definition tool 80 then enters the direction of evaluation as shown in step 88 and enters the ranking of the discrete phrases and correspondingly ranks the products as shown in step 89. In the present example, the phrases "CD-ROM", "CD-R" and "CD-RW" are in the order of desirability in a computer as appreciated in the computer arts. Once again, the order or ranking can be determined manually or automatically. Moreover, if the discrete phrase is not evaluative, then a ranking for the discrete phrase is entered in step 89 and the next phrase is analyzed. Of course, because such a discrete phrase is not evaluative, the ranking for the phrase will likely be low as compared to evaluative discrete phrases.

Lastly, if the phrase is neither discrete nor numeric, then the phrase is designated as free-form text as shown in step 87, a ranking is entered as shown in step 89 and the next phrase is analyzed. Such free-form text would be relatively rare since the phrase was deemed to be a product property. In certain products however, such free-form text may be desirable and add value to the product or undesirable and diminish the value of the product. For instance, an autograph or inscription on a product may be considered as free-form text which would add value to the product.

In the preferred embodiment of the present invention illustrated in FIG. 5, once the analysis as shown in property definition tool 80 is completed on the product phrase information stored in product phrase database 76, the resulting product properties (i.e. phrases that descriptively characterize the product or product category) are stored in a product property database 90. In addition, by executing property definition tool 80, these product properties that are stored in product property database 90 and are also ranked in order of significance in the product or product category. Thus, in the above examples of computers, product property database 90 will have a record of product properties such as MHz, Mb RAM, Gb, CD-ROM, CD-R, CD-RW, etc. as well as many other product properties and attributes relevant for evaluating a computer. Moreover, through the execution of property definition tool 80, these product properties are ranked as well. As will be discussed in further detail below, these stored product properties of the product property database may then be retrieved for use in evaluating products that are available from various merchants on their respective merchant's Web pages to thereby provide a single shopping interface which seamlessly integrates plural on-line merchants to thus facilitate comparison shopping in an on-line environment.

Of course, it should noted that whereas the above aspects of the present invention have been described as applied to computers, the present invention is not limited thereto and computers were merely selected as an example of how product literature crawler 72 and property definition tool 80 may be used. In this regard, it should be appreciated that the present invention may be applied to all different products and services that can be effectively marketed on a networked environment such as Internet 100. Thus, the present invention may be applied to all goods as well as many services including insurance, financial services, rentals, lodging, transportation, vacation packages, etc. in a manner similar to that discussed above.

Figure 6:
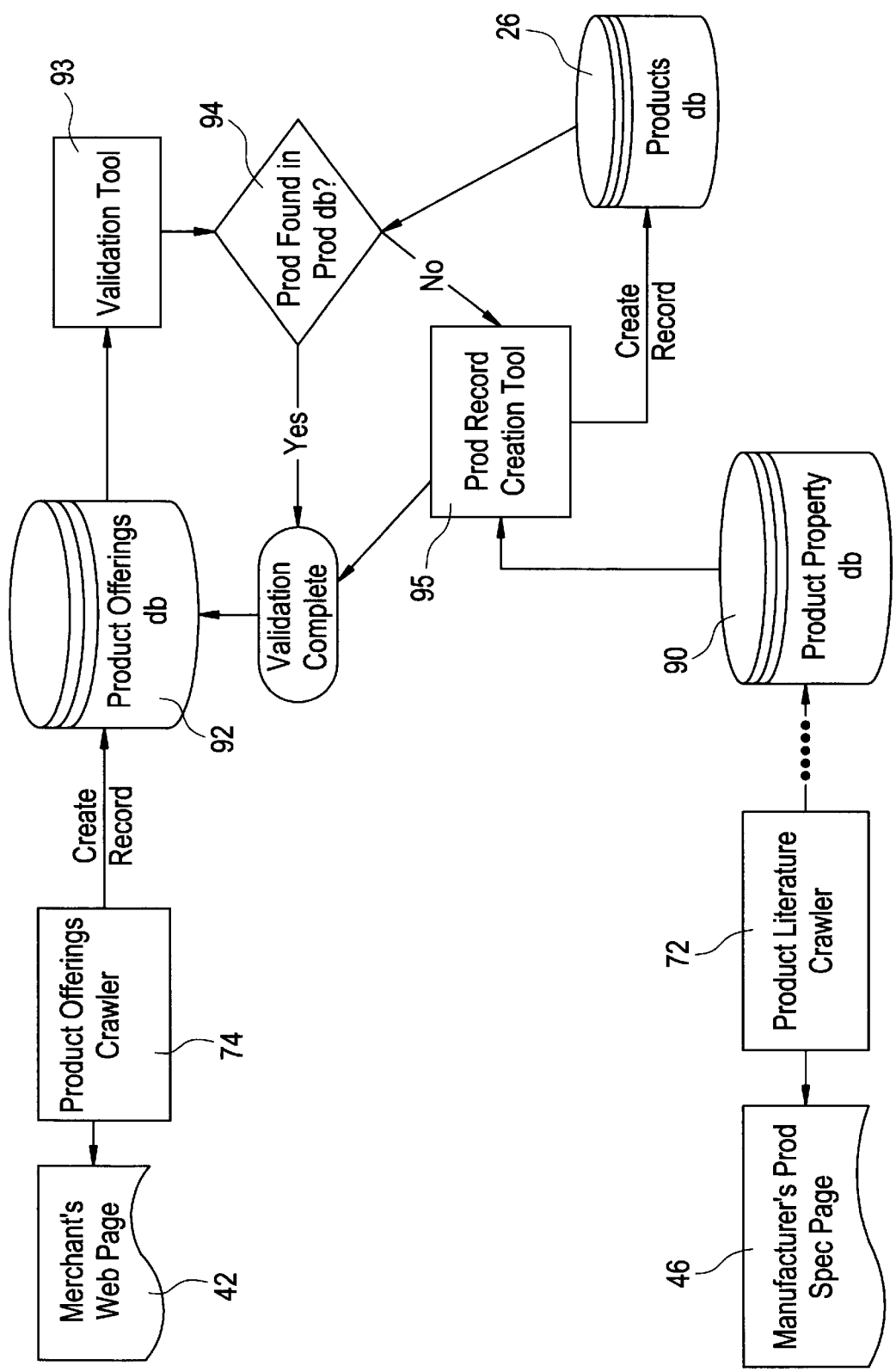
FIG. 6 is a block diagram of a method in accordance with one embodiment of the present invention for validating the product offerings of on-line merchants and for creating a new product record based on the determined product properties.

FIG. 6 shows a block diagram of a method in accordance with the preferred embodiment of the present invention for validating the product offerings of on-line merchants and for creating a new product record based on product properties. As can be appreciated, the lower portion of FIG. 6 provides an abbreviated illustration of FIG. 5 which was discussed in detail above which primarily explained the method for determining product properties as gathered from manufacturer's product specification Web pages 46 and other sources by product literature crawler 72. In a similar manner, product phrase information may be gathered from the merchant's information source such as the merchant's Web page 42 by product offerings crawler 74 which may also be generated by shopping server 20. Thus, like product literature crawler 72, product offerings crawler 74 gathers product phrase information from merchant's Web page 42 including a phrase and at least one characteristic of the phrase utilizing computational linguistics module (not shown). Again, the characteristic of the phrase may be its frequency, location, font size, font style, font case, font effects, and font color of the phrase in the Web page as well as the frequency of collocation and co-occurrence of phrases.

In addition, because each merchant will likely offer various models of more than one manufacturer, product offerings crawler 74 also obtains information regarding product model and manufacturer's identity. Moreover, because each of the products may be purchased-through a particular merchant at a specified price as designated by the particular merchant, merchant identity information such as the merchant's URL, and price information for each of the offered products are also gathered by product offerings crawler 74 so that information regarding the product, price, and the identity of the merchant offering the product at a given price are all correlated to one another. All of the above described gathered information is stored into product offerings database 92. The details of how the manufacturer's identity, product model, product phrase information, merchant identity information and the pricing information are all gathered is substantially similar to the method described above relative product literature crawler 72 of FIG. 5 and thus, are omitted here to avoid repetition. However, based on the teachings above, it should be clear to a person skilled in the art how such information can be gathered utilizing product offerings crawler 74 and be saved in product offerings database 92.

Thus, in correspondence with the computer example used above, products offerings crawler 74 may visit various Web pages of computer merchants to gather all the required information regarding every make and model of computers offered in computer merchant's Web page 42 as well as the merchant identity information such as the merchant's relevant URL. This information is stored in product offerings database 92 in a uniform format for further processing.

In accordance with the preferred embodiment of the present method as shown in FIG. 6, once the above noted information is gathered and stored in product offerings database 92, it is validated using validation tool 93 to match the various merchant offerings to the product information stored in products database 26 in shopping server 20 shown in FIG. 1. As described previously, the products database 26 on shopping server 20 stores product information such as product descriptions, pricing, and other product information for plural merchants which may be culled from merchant servers 40 using automated product offerings crawler 74. Shopping server 20 accesses and presents the product information stored in products database 26 to client computer 12 to thereby provide a single shopping interface with seamlessly integrated plural on-line merchants to thereby facilitate comparison shopping in an on-line environment.

For each given product offering in product offerings database 92, products database 26 is searched to determine if there is a corresponding match present in products database 26 as shown in step 94. If there is such a match, the validation is deemed to be completed for the particular product offering and another product offering in product offerings database 92 is selected for validation via validation tool 93. It should be noted that validation tool 93 may preferably be executed by a human editor who accesses via a computer or other means, product database 26. However, validation tool 93 may also be executed by a computer or other automated device.

If however, a corresponding match in products database 26 is not found, product record creation tool 95 may be executed to update products database 26 with the new product offering found in product offerings database 92. In this regard, product property database 90 as described previously is accessed to provide the ranked product properties of a product or product category to product record creation tool 95. These ranked product properties which were obtained via product literature crawler 72 can be then used to create a record on products database 26 for the new product offering found in product offerings database 92 thereby ensuring the obtaining of the important product properties for the new product offering. It is again noted that the product record creation tool 95 may preferably be executed by a human editor. However, product record creation tool 95 may be executed by a computer or other automated device.

Correspondingly, referring again to the computer example, the ranked product properties which were processed via product definition tool 80 and stored in product property database 90 can be provided to product record creation tool 95 so that all of the important product properties for the new product offering are obtained and entered into product database 26 when a new record is created. These product properties will include MHz, Mb RAM, Gb, CD-ROM, CD-R, CD-RW, etc. as well as many other product properties and attributes stored in the product property database 90 which are relevant for evaluating a computer. Of course, again, it is noted that application to computer sales were merely selected as an example and that the present invention may be applied to all different products and services that can be effectively marketed on a networked environment such as the Internet 100.

Thus, in this manner, the present invention also allows new product offerings available in the marketplace to be easily integrated into the products database 26 thereby periodically updating products database 26 to ensure accurate offering of newest products and prices to client computer 12. However, as can now be appreciated, because the updating is attained via product offerings crawler 74, the product information is not updated in real time, but rather periodically in the background of shopping server 20. The product information on products database 26 can be used to display products available for purchase by product type, part numbers, price, keywords, or product features in any desirable mariner using an interface of shopping server 20 as described previously. The product information can be displayed side by side in the browser window of client computer 12 to permit the shopper to comparison shop and choose products from any one or more of merchant servers 40 based on the product information. Once the shopper has selected all desired products and options from all desired merchants, the shopper can complete the shopping and "check out" as described previously by confirming the order which verifies pricing information, shipping information, and other details of the desired purchase.

It is again noted that in the above described embodiment, property definition tool 80, validation tool 93 and product record creation tool 95 are preferably executed by a human editor utilizing a computer or other device so that their execution is semi-automatic. Because of the present invention provides these distinct tools with distinct functions, human editors having different skills and knowledge can be utilized for each of the tools. For instance, it takes a relatively lower level of skill and knowledge to execute validation tool 93 and product record creation tool 95, whereas it takes a higher degree of skill and knowledge to execute property definition tool 80. Therefore, the present embodiment allows efficient human resource management since the tools and their respective functions are preferably separated and more experienced human editors can be assigned to execute property definition tool 80 and the less experienced human editors can be assigned to execute the other tools. Of course, it should also be appreciated that in alternative embodiments, the above noted tools may be combined in part or in total and can also be executed automatically via computer or other device so that use of human editors is not necessary.

Furthermore, it should also be noted that one embodiment of the present invention has been described above where the Internet is the networked computer environment and the crawler is a Web crawler. Moreover, in the embodiment described above, the manufacturer's product specifications Web pages are deemed to be the manufacturer's product specifications source and the merchant's Web page are deemed to be the merchant's information source. However, the present invention is not limited thereto and may be applied to other types of networked computer environments and other sources as well. The present invention can be implemented over any type of communications channel, such as the Internet, a local area network (LAN), a wide area network (WAN), direct computer connections, or the like, using any type of communication hardware and protocols. Any type of hardware or combination of hardware can be used for the various clients and servers. Accordingly, the term "computer" as used above, refers to any type of computing device or data terminal, such as a personal computer, a portable computer, a dumb terminal, a thin client, a hand held device, a wireless phone, or any combination of such devices. The various clients and servers can be a single computer at a single location or multiple computers at a single or multiple locations. For example a server may be comprised of a plurality of redundant computers disposed in co-location facilities at various locations to facilitate scalability. Any appropriate server or client software can be used and any communication protocols can be used. Communication can be accomplished over electric cable, fiber optic cable, any other cable, or in a wireless manner using radio frequency, infrared, or other technologies. Any interface can be used for selecting products for purchase. The various information can be stored in any format and thus the term "database" as used above refers to any collection of information such as a database file, a lookup table, or the like.

Thus, the above described method and apparatus in accordance with the embodiments of the present invention provides a very effective system and method for aggregating desirable product information. As can now be fully appreciated, the present invention facilitates on-line commerce by allowing the provision of important product information to the shopper to thereby facilitate an informed purchase decision by the shopper. The present invention also provides a novel method for efficiently aggregating such product information from a networked computer environment and also provides a novel method for providing updated product information to shoppers thereby facilitating the purchase decision of the shopper.

The invention has been described through a preferred embodiment. However various modifications can be made without departing from the scope of the invention as defined by the appended claims and legal equivalents.

What is claimed is:

1. A method of aggregating product information for use in a product database including various products arranged in product categories, the product information being collected from a plurality of sources in a networked computer environment regarding products of a product category comprising the steps of:
   generating a crawler from a server interconnected to the network computer environment to visit the plurality of sources;
   gathering product phrase information from each of the plurality of sources via said crawler; and
   determining whether at least one phrase of said product phrase information is a product characteristic associated with a product category;
   wherein said crawler utilizes computational linguistics to gather said product phrase information which includes a phrase and at least one characteristic of said phrase.

2. The method of claim 1, wherein said at least one characteristic of said phrase includes at least one of frequency, location, font size, font style, font case, font effects, font color, collocation and co-occurrence of said phrase in each of said plurality of sources.

3. The method of claim 2, wherein the plurality of sources include at least one of a manufacturer's product specifications source, a product literature source, and a merchant's information source.

4. The method of claim 3, wherein said crawler includes a product literature crawler that gathers product phrase information from at least one of said manufacturer's product specifications source and said product literature source.

5. The method of claim 4, said determining step further including the step of cross-referencing said product phrase information to a category database to determine a product category of at least one of a manufacturer's product specifications source, a product literature source, and a merchant's information source.

6. The method of claim 4, further including the step of applying statistical analysis to said product phrase information to rank each phrase based on said at least one characteristic of said phrase thereby providing a ranking of phrases.

7. The method of claim 6, further including the step of storing at least one of said product phrase information and said ranking of phrases in a product phrase database.

8. The method of claim 3, wherein said crawler includes a product offerings crawler that gathers pricing information and at least one of product phrase information, product model information, manufacturer's identity information, and merchant identity information from said merchant's information source.

9. The method of claim 8, wherein information gathered by said product offerings crawler is stored in a product offerings database.

10. The method of claim 3, wherein said a manufacturer's product specifications source is a manufacturer's product specifications Web page, said product literature source is a product literature Web page, and said merchant's information source is a merchant's Web page.

11. The method of claim 1, further including the step of storing each phrase determined to be a product property in a product property database.

12. The method of claim 11, further including the step of ranking phrases determined to be a product property.

13. The method of claim 11, wherein said crawler includes a product offerings crawler that gathers pricing information and at least one of product phrase information, product model information, manufacturer's identity information, and merchant identity information from said merchant's information source.

14. The method of claim 13, wherein information gathered by said product offerings crawler is stored in a product offerings database.

15. The method of claim 1, wherein said networked computer environment is the Internet and said crawler is a Web crawler.

16. A method of aggregating product information from a plurality of sources in a networked computer environment regarding products of a product category comprising the steps of:
generating a crawler from a server interconnected to the network computer environment to visit the plurality of sources including at least one of a manufacturer's product specifications source, a product literature source, and a merchant's information source, said crawler including a product literature crawler that gathers product phrase information from at least one of said manufacturer's product specifications source and said product literature source;
gathering product phrase information from each of the plurality of sources via said crawler, said crawler utilizing computational linguistics to gather said product phrase information which includes a phrase and at least one characteristic of said phrase, said at least one characteristic of said phrase including at least one of frequency, location, font size, font style, font case, font effects, font color, collocation and co-occurrence of said phrase in each of said plurality of sources;
applying statistical analysis to said product phrase information to rank each phrase based on said at least one characteristic of said phrase thereby providing a ranking of phrases;
determining whether each phrase of each of said product phrase information is a product property indicative of a characteristic of at least one of a product and a product category; and
determining whether each phrase determined to be a product property is evaluative.

17. The method of claim 16, further including the step of determining a direction of evaluation and determining a ranking of a phrase if said phrase is determined to be evaluative.

18. A method of aggregating product information from a plurality of sources in a networked computer environment regarding products of a product category comprising the steps of:
generating a crawler from a server interconnected to the network computer environment to visit the plurality of sources including at least one of a manufacturer's product specifications source, a product literature source, and a merchant's information source, said crawler including a product literature crawler that gathers product phrase information from at least one of said manufacturer's product specifications source and said product literature source;
gathering product phrase information from each of the plurality of sources via said crawler, said crawler utilizing computational linguistics to gather said product phrase information which includes a phrase and at least one characteristic of said phrase, said at least one characteristic of said phrase including at least one of frequency, location, font size, font style, font case, font effects, font color, collocation and co-occurrence of said phrase in each of said plurality of sources;
applying statistical analysis to said product phrase information to rank each phrase based on said at least one characteristic of said phrase thereby providing a ranking of phrases;
determining whether each phrase of each of said product phrase information is a product property indicative of a characteristic of at least one of a product and a product category; and
determining whether each phrase determined to be a product property is numeric.

19. The method of claim 18, further including the step of entering a range and interval of a phrase if said phrase is determined to be numeric.

20. A method of aggregating product information from a plurality of sources in a networked computer environment regarding products of a product category comprising the steps of:
generating a crawler from a server interconnected to the network computer environment to visit the plurality of sources including at least one of a manufacturer's product specifications source, a product literature source, and a merchant's information source, said crawler including a product literature crawler that gathers product phrase information from at least one of said manufacturer's product specifications source and said product literature source;

gathering product phrase information from each of the plurality of sources via said crawler, said crawler utilizing computational linguistics to gather said product phrase information which includes a phrase and at least one characteristic of said phrase, said at least one characteristic of said phrase including at least one of frequency, location, font size, font style, font case, font effects, font color, collocation and co-occurrence of said phrase in each of said plurality of sources;

applying statistical analysis to said product phrase information to rank each phrase based on said at least one characteristic of said phrase thereby providing a ranking of phrases;

determining whether each phrase of each of said product phrase information is a product property indicative of a characteristic of at least one of a product and a product category; and determining whether each phrase determined to be a product property is discrete.

21. The method of claim 20, further including the step of entering enumerated value names of a phrase if said phrase is determined to be discrete.

22. A method of aggregating product information from a plurality of sources in a networked computer environment regarding products of a product category:comprising the steps of:

generating a crawler from a server interconnected to the network computer environment to visit the plurality of sources including at least one of a manufacturer's product specifications source, a product literature source, and a merchant's information source, said crawler including a product literature crawler that gathers product phrase information from at least one of said manufacturer's product specifications source and said product literature source;

gathering product phrase information from each of the plurality of sources via said crawler, said crawler utilizing computational linguistics to gather said product phrase information which includes a phrase and at least one characteristic of said phrase, said at least one characteristic of said phrase including at least one of frequency, location, font size, font style, font case, font effects, font color, collocation and co-occurrence of said phrase in each of said plurality of sources;

applying statistical analysis to said product phrase information to rank each phrase based on said at least one characteristic of said phrase thereby providing a ranking of phrases;

determining whether each phrase of each of said product phrase information is a product property indicative of a characteristic of at least one of a product and a product category;

storing each phrase determined to be a product property in a product property database;

ranking phrases determined to be a product property; and determining if said phrase is numeric;

if said phrase is numeric, entering range and interval for said numeric phrase, and determining if said numeric:phrase is evaluative;

if said numeric phrase is evaluative, determining a direction of evaluation and determining ranking of said phrase;

if said numeric phrase is not evaluative, determining a ranking for said numeric phrase;

if said phrase is not numeric, determining if said phrase is discrete;

if said phrase is discrete, entering enumerated value names for said discrete phrase and determining if said discrete phrase is evaluative;

if said discrete phrase is evaluative, entering direction of evaluation and entering a ranking for said discrete phrase;

if said discrete phrase is not evaluative, entering a ranking for said discrete phrase; and if said phrase is not discrete, designating said phrases as free-form text and entering a ranking for said free-form text.

23. A method of aggregating product information from a plurality of sources in a networked computer environment regarding products of a product category comprising the steps of:

generating a crawler from a server interconnected to the network computer environment to visit the plurality of sources including at least one of a manufacturer's product specifications source, a product literature source, and a merchant's information source, said crawler including a product literature crawler that gathers product phrase information from at least one of said manufacturer's product specifications source and said product literature source, and also including a product offerings crawler that gathers pricing information and at least one of product phrase information, product model information, manufacturer's identity information, and merchant identity information from said merchant's information source;

gathering product phrase information from each of the plurality of sources via said crawler, said crawler utilizing computational linguistics to gather said product phrase information which includes a phrase and at least one characteristic of said phrase, said at least one characteristic of said phrase including at least one of frequency, location, font size, font style, font case, font effects, font color, collocation and co-occurrence of said phrase in each of said plurality of sources;

applying statistical analysis to said product phrase information to rank each phrase based on said at least one characteristic of said phrase thereby providing a ranking of phrases;

determining whether each phrase of each of said product phrase information is a product property indicative of a characteristic of at least one of a product and a product category;

storing each phrase determined to be a product property in a product property database, and storing information gathered by said product offerings crawler in a product offerings database; and further including a validation step wherein information stored in said product offerings database is cross-referenced with a products database to determine whether any products identified in said product offerings database is absent from said products database.

24. The method of claim 23, further including the step of creating a new product record in said products database based on information stored in said product offerings database.

25. The method of claim 24, further including the step of utilizing said product properties from said product property database to create said new product record.

26. A method of aggregating product information from a plurality of sources in a networked computer environment regarding products of a product category comprising the steps of:
generating a crawler from a server interconnected to the network computer environment to visit the plurality of sources including at least one of a manufacturer's product specifications source, a product literature source, and a merchant's information source, said crawler including a product offerings crawler that gathers pricing information and at least one of product phrase information, product model information, manufacturer's identity information, and merchant identity information from said merchant's information source;
gathering product phrase information from each of the plurality of sources via said crawler, said crawler utilizing computational linguistics to Rather said product phrase information which includes a phrase and at least one characteristic of said phrase, said at least one characteristic of said phrase including at least one of frequency, location, font size, font style, font case, font effects, font color, collocation and co-occurrence of said phrase in each of said plurality of sources;
applying statistical analysis to said product phrase information to rank each phrase based on said at least one characteristic of said phrase thereby providing a ranking of phrases;
storing information gathered by said product offerings crawler in a product offerings database; and
validation step wherein information stored in said product offerings database is cross-referenced with a products database to determine whether any products identified in said product offerings database is absent from said products database.

27. The method of claim 26, further including the step creating a new product record in said products database based on information stored in said product offerings database.

28. A computer architecture for effecting commerce in a networked environment comprising:
a client computer;
a shopping server executing an agent server application, said shopping server including a memory device having a product database stored therein;
a merchant server executing a commerce server application and being remote from said shopping server;
a manufacturer server executing a commerce server application and being remote from said shopping server; and
a communication channel coupling said shopping server to said merchant server and said manufacturer's server, and coupling said shopping server with said client computer;
wherein said shopping server is operative to provide a crawler for visiting a plurality of sources hosted on at least one of said merchant server and said manufacture's server to aggregate product information from said plurality of sources regarding products of a product category, to gather product phrase information from said plurality of sources, and to determine whether at least one of said product phrase information is a product characteristic associated with a product category.

29. The computer architecture of claim 28, wherein said crawler is operative to gather product phrase information from each of the plurality of sources utilizing computational linguistics.

30. The computer architecture of claim 29, wherein said at least one characteristic of said phrase includes at least one of frequency, location, font size, font style, font case, font effects, font color, collocation and co-occurrence of said phrase in each of said plurality of sources.

31. The computer architecture of claim 30, further including a product phrase database for storing said product phrase information from each of the plurality of sources.

32. The computer architecture of claim 31, wherein said computer architecture is operative to execute statistical analysis to said product phrase information to rank each of said phrase based on said at least one characteristic of said phrase and provide a ranking of phrases.

33. The computer architecture of claim 30, wherein said merchant server hosts a plurality of merchant's information sources, and said manufacturer server hosts a plurality of manufacturer's product specification sources.

34. The computer architecture of claim 33, wherein said crawler includes a product literature crawler that gathers product phrase information from said plurality of manufacturer's product specifications sources, and also includes a product offerings crawler that gathers product phrase information and pricing information of each of said products in said product category from said plurality of merchant's information sources.

35. The computer architecture of claim 34, further including an offerings database for storing said pricing information of each of said products from said plurality of merchant's information sources.

36. The computer architecture of claim 28, further comprising a product property database for storing said product phrase information determined to be a product characteristic.

37. The computer architecture of claim 36, wherein said computer architecture is operative to rank each said product phrase information in said product property database.

38. The computer architecture of claim 28, wherein said communication channel includes the Internet and said crawler is a Web crawler.

39. The computer architecture of claim 38, wherein said a manufacturer's product specifications source is a manufacturer's product specifications Web page, said product literature source is a product literature Web page, and said merchant's information source is a merchant's Web page.

40. A computer architecture for effecting commerce in a networked environment comprising:
a client computer;
a shopping server executing an agent server application, said shopping server including a memory device having a product database stored therein;
a merchant server executing a commerce server application and being remote from said shopping server;
a manufacturer server executing a commerce server application and being remote from said shopping server;
a communication channel coupling said shopping server to said merchant server and said manufacturer's server, and coupling said shopping server with said client computer;
wherein said shopping server is operative to provide a crawler for visiting a plurality of sources hosted on at least one of said merchant server and said manufacture's server to aggregate product information from said plurality of sources regarding products of a product category;

wherein said crawler is operative to gather product phrase information from each of the plurality of sources utilizing computational linguistics, said product phrase information including a phrase and at least one characteristic of said phrase;

wherein said at least one characteristic of said phrase includes at least one of frequency, location, font size, font style, font case, font effects, font color, collocation and co-occurrence of said phrase in each of said plurality of sources;

wherein said merchant server hosts a plurality of merchant's information sources, and said manufacturer server hosts a plurality of manufacturer's product specification sources;

wherein said crawler includes a product literature crawler that gathers product phrase information from said plurality of manufacturer's product specifications sources, and also includes a product: offerings crawler that gathers product phrase information and pricing information of each of said products in said product category from said plurality of merchant's information sources;

further including an offerings database for storing said pricing information of each of said products from said plurality of merchant's information sources; and further including a products database wherein said computer architecture is operative to cross-reference said product offerings database to said products database to add new products to said products database which are available on said product offerings database.

* * * * *